(12) United States Patent
Schnug et al.

(10) Patent No.: US 9,469,347 B1
(45) Date of Patent: Oct. 18, 2016

(54) VEHICLES INCLUDING A WHEEL WELL REINFORCEMENT MEMBER

(71) Applicant: Toyota Motor Engineering & Manufacturing North America, Inc., Erlanger, KY (US)

(72) Inventors: Tyler E. Schnug, Northville, MI (US); Min Zhu, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/793,006

(22) Filed: Jul. 7, 2015

(51) Int. Cl.
*B62D 21/00* (2006.01)
*B62D 25/04* (2006.01)
*B62D 21/15* (2006.01)
*B60R 21/00* (2006.01)

(52) U.S. Cl.
CPC ............ *B62D 21/155* (2013.01); *B60R 21/00* (2013.01); *B62D 25/04* (2013.01); *B60R 2021/0004* (2013.01)

(58) Field of Classification Search
CPC .... B62D 21/155; B62D 25/04; B60R 21/00; B60R 2021/0004
See application file for complete search history.

(56) References Cited

U.S. PATENT DOCUMENTS

| | | | |
|---|---|---|---|
| 5,042,872 A * | 8/1991 | Yoshii | B62D 25/025 296/203.02 |
| 5,653,495 A | 8/1997 | Bovellan et al. | |
| 6,364,358 B1 | 4/2002 | Miller | |
| 6,447,052 B2 | 9/2002 | Saeki | |
| 6,866,115 B2 | 3/2005 | Miyasaka | |
| 7,735,870 B2 | 6/2010 | Kosaka et al. | |
| 8,029,050 B2 | 10/2011 | Tamakoshi | |
| 8,371,643 B2 | 2/2013 | Itakura | |
| 8,469,442 B1 | 6/2013 | Pencak et al. | |
| 9,187,133 B2 * | 11/2015 | Rangaswamaiah | B62D 25/04 |
| 2009/0195019 A1 * | 8/2009 | Yamada | B62D 25/04 296/187.01 |
| 2013/0285414 A1 | 10/2013 | Alavandi et al. | |
| 2014/0232136 A1 | 8/2014 | Gilbert et al. | |
| 2015/0246692 A1 * | 9/2015 | Rangaswamaiah | B62D 25/04 296/187.1 |
| 2016/0039466 A1 * | 2/2016 | Yamamoto | B62D 25/04 296/193.06 |
| 2016/0052554 A1 * | 2/2016 | Ozawa | B62D 21/152 296/187.09 |

* cited by examiner

*Primary Examiner* — Drew Brown
(74) *Attorney, Agent, or Firm* — Dinsmore & Shohl LLP (57) ABSTRACT

Embodiments of vehicles including wheel well reinforcement members are discussed and disclosed herein. In one embodiment, a vehicle includes a wheel well, a rocker coupled to the wheel well, where the rocker extends rearward from the wheel well in a vehicle longitudinal direction, a torque box coupled to the rocker, and a reinforcement member positioned at least partially within the wheel well, the reinforcement member including a forward face that is coupled the radially inward facing side of the wheel well, and at least one of a downward face that is coupled to and extends along the torque box and that is oriented to face downward in a vehicle vertical direction and an outboard face that is coupled to and extends along the rocker and that is oriented to face outboard in the vehicle lateral direction.

13 Claims, 7 Drawing Sheets

VEHICLES INCLUDING A WHEEL WELL REINFORCEMENT MEMBER

TECHNICAL FIELD

The present specification generally relates to vehicles, and more specifically, vehicles that include a wheel well reinforcement member.

BACKGROUND

Vehicles may be equipped with bumper systems and impact protection structures that elastically and plastically deform to absorb energy in the event of an impact.

In one example, a substantial portion of energy from an impact with a small front bumper overlap may be directed outboard of many of the energy absorbing structures of the vehicle. Because a substantial portion of the energy from the impact is directed into the bumper assembly at a position that is outboard of many of the energy absorbing structures of the vehicle, the energy from the impact may not be absorbed or may only be partially absorbed by those energy absorbing structures of the vehicle. The unabsorbed energy may be directed into a front suspension unit and transferred rearward along the vehicle as the front suspension unit contacts vehicle structures proximate to a passenger cabin of the vehicle.

Accordingly, a need exists for alternative structures for transferring energy and absorbing energy from an impact with a small overlap to the front bumper.

SUMMARY

In one embodiment, a vehicle includes a wheel well including a radially inward facing side, a suspension unit including a wheel that is positioned at least partially within the wheel well, a rocker coupled to the wheel well, where the rocker extends rearward from the wheel well in a vehicle longitudinal direction, a torque box coupled to the rocker, where the torque box is positioned rearward from the wheel well in the vehicle longitudinal direction and where the torque box extends inboard from the rocker in a vehicle lateral direction that is transverse to the vehicle longitudinal direction, and a reinforcement member positioned at least partially within the wheel well, the reinforcement member including a forward face that is coupled the radially inward facing side of the wheel well, and at least one of a downward face that is coupled to and extends along the torque box and that is oriented to face downward in a vehicle vertical direction and an outboard face that is coupled to and extends along the rocker and that is oriented to face outboard in the vehicle lateral direction.

In another embodiment, a vehicle includes a rocker that extends in a vehicle longitudinal direction, a forward pillar coupled to the rocker, where the forward pillar extends upward from the rocker in a vehicle vertical direction, a torque box that is coupled to the rocker, where the torque box extends inboard from the rocker in a vehicle lateral direction that is transverse to the vehicle longitudinal direction, and a reinforcement member including a forward face that extends along the forward pillar and that is oriented to face forward in the vehicle longitudinal direction, and at least one of a downward face that is coupled to and extends along the torque box and that is oriented to face downward in the vehicle vertical direction and an outboard face that is coupled to and extends along the rocker and that is oriented to face outboard in the vehicle lateral direction.

In yet another embodiment, a vehicle includes a rocker that extends in a vehicle longitudinal direction, a forward pillar coupled to the rocker, where the forward pillar extends upward from the rocker in a vehicle vertical direction, and a reinforcement member including a forward face that is positioned forward of and spaced apart from the forward pillar such that a gap is positioned between the forward face and the forward pillar, and an outboard face that is coupled to the forward pillar and the rocker such that the gap is at least partially enclosed between the reinforcement member and the forward pillar.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a wheel well including a radially inward facing side, a suspension unit including a wheel that is positioned at least partially within the wheel well, and a rocker coupled to the wheel well, where the rocker extends rearward from the wheel well in a vehicle longitudinal direction. A torque box is coupled to the rocker. The torque box is positioned rearward from the wheel well in the vehicle longitudinal direction and where the torque box extends inboard from the rocker in a vehicle lateral direction that is transverse to the vehicle longitudinal direction. A reinforcement member positioned at least partially within the wheel well, the reinforcement member including a forward face that is coupled the radially inward facing side of the wheel well. The reinforcement member includes at least one of a downward face that is coupled to and extends along the torque box and that is oriented to face downward in a vehicle vertical direction and an outboard face that is coupled to and extends along the rocker and that is oriented to face outboard in the vehicle lateral direction. In some embodiments, the vehicle includes a forward pillar, and the forward face of the reinforcement member extends along the forward pillar. In other embodiments, the forward face of the reinforcement member is spaced apart from the forward pillar such that a gap is positioned between the forward face and the forward pillar. The reinforcement member may selectively absorb and direct forces and/or energy associated with a small front bumper overlap impact. Various embodiments of vehicles including a wheel well reinforcement member will be described in more detail herein with specific reference to the appended drawings.

Figure 1:
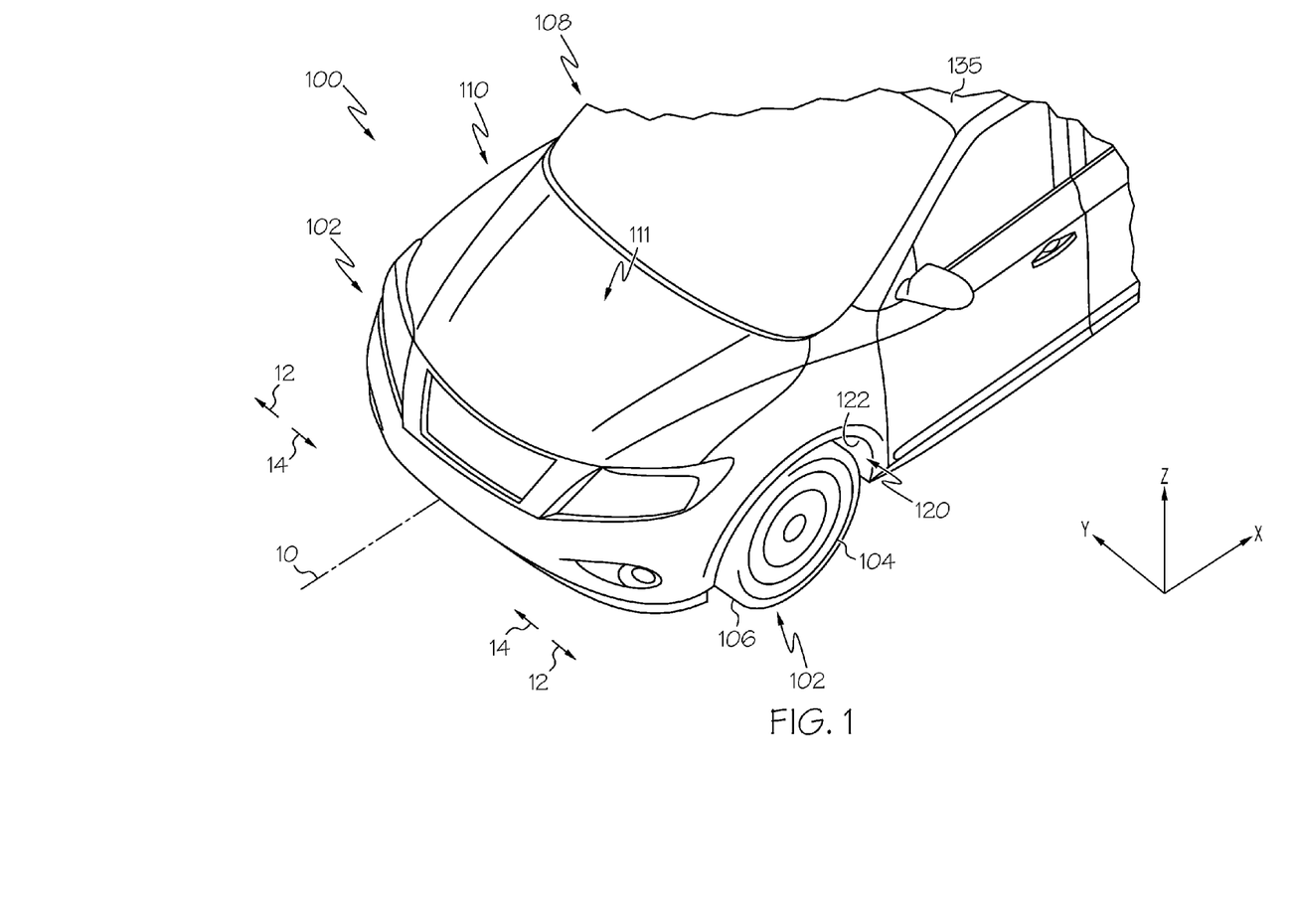
FIG. 1 schematically depicts a perspective view of a vehicle according to one or more embodiments shown or described herein.

As used herein, the term "vehicle longitudinal direction" refers to the forward-rearward direction of the vehicle (i.e., in the +/−vehicle X-direction as depicted). The term "vehicle lateral direction" refers to the cross-vehicle direction (i.e., in the +/−vehicle Y-direction as depicted), and is transverse to the vehicle longitudinal direction. The term "vehicle vertical direction" refers to the upward-downward direction of the vehicle (i.e., in the +/−vehicle Z-direction as depicted). Further, the terms "inboard" and "outboard" are used to describe the relative positioning of various components of the vehicle. Referring to FIG. 1, the term "outboard" as used herein refers to the relative location of a component in direction 12 with respect to a vehicle centerline 10. The term "inboard" as used herein refers to the relative location of a component in direction 14 with respect to the vehicle centerline 10. Because the vehicle structures may be generally symmetrical about the vehicle centerline 10, the direction to which use of the terms "inboard" and "outboard" refer may be mirrored about the vehicle centerline 10 when evaluating components positioned along opposite sides of the vehicle 100.

Motor vehicles that incorporate elements according to the present disclosure may include a variety of construction methodologies that are conventionally known, including the unibody construction methodology depicted in FIG. 1 as well as a body-on-frame construction methodology. While the embodiments of the present disclosure are described and depicted herein with reference to unibody structures, it should be understood that vehicles that are constructed with body-on-frame construction may incorporate the elements that are shown and described herein. Furthermore, the Figures may only show one side of the vehicle. Descriptions of the other side of the vehicle may be omitted because both sides of the vehicle may be laterally symmetrical and substantially the same.

Referring initially to FIG. 1, a vehicle 100 is depicted. The vehicle 100 includes a body 110 onto which a vehicle drivetrain is coupled. The vehicle 100 also includes a cabin 108 that is integral with the body 110 and a front bay 111 where a drive source (e.g., engine and/or electric motor) may be located. In some embodiments, the drive source may be positioned in a rear portion of the vehicle, and the front bay 111 may utilized as a storage compartment. The cabin 108 generally defines a passenger cabin of the vehicle 100.

A front suspension unit 102 may be coupled to the body 110. The front suspension unit 102 may be coupled to a side support 112 (FIG. 2) of the body 110. As used herein, the front suspension unit 102 may generally include vehicle components that connect the body 110 to a tire 106. The front suspension unit 102 may include a wheel 104 that is surrounded by the tire 106.

The body 110 includes a wheel well 120 that is positioned at a front end of the vehicle 100. At least a portion of the front suspension unit 102 may be positioned within the wheel well 120. The wheel well 120 includes a radially-inward facing side 122 that may surround at least a portion of the wheel 104 and the tire 106 of the front suspension unit 102.

Figure 2:
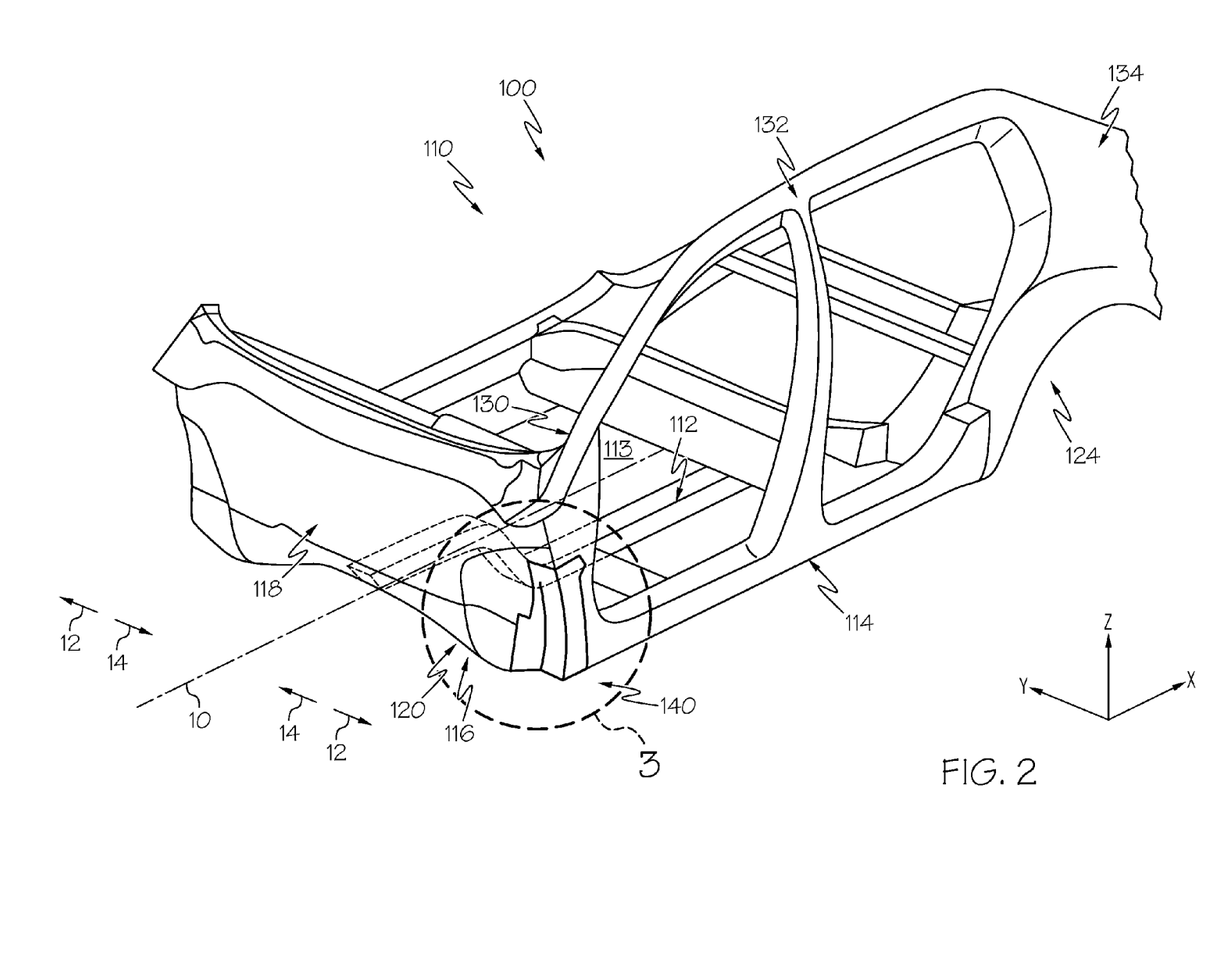
FIG. 2 schematically depicts a perspective view of a body of the vehicle of FIG. 1 according to one or more embodiments shown or described herein.

Referring to FIG. 2, a perspective view of the body 110 is depicted with certain panels removed for clarity. The body 110 includes a dash panel 118 that is positioned at a forward portion of the body 110. The dash panel 118 extends in the vehicle lateral direction and the vehicle vertical direction to separate the front bay 111 (FIG. 1) and the cabin 108. The dash panel 118 may be integral with or may be coupled to the wheel well 120. The body 110 includes a rocker 114 that extends rearward from the dash panel 118 in the vehicle longitudinal direction. The rocker 114 is coupled to the wheel well 120 and/or the dash panel 118. Alternatively, the rocker 114 may be integral with the wheel well 120 and/or the dash panel 118. The rocker 114 may extend between the wheel well 120 at the front portion of the vehicle 100 and a rear wheel well 124 at the rear portion of the vehicle 100 in the vehicle longitudinal direction.

One or more pillars extend upward from the rocker 114 in the vehicle vertical direction. The pillars include a forward pillar 130 (e.g., an A-pillar and/or hinge pillar) that extends upward from the rocker 114 in the vehicle vertical direction. The vehicle may also include a center pillar 132 and/or a rear pillar 134 (e.g., a B-pillar and/or a C-pillar) positioned rearward from the forward pillar 130 in the vehicle longitudinal direction. The forward pillar 130, the center pillar 132, and/or the rear pillar 134 may support a roof 135 (FIG. 1) of the vehicle 100. The forward pillar 130, the center pillar 132, and the rear pillar 134 may be integral with the rocker 114 or may be coupled to the rocker 114.

The body 110 further includes the side support 112 that extends in the vehicle longitudinal direction. The side support 112 is positioned inboard of and spaced apart from the rocker 114 in the vehicle lateral direction. As described above, the side support 112 may be coupled to the front suspension unit 102. The side support 112 may form a portion of a floor 113 of the cabin 108.

Figure 3:
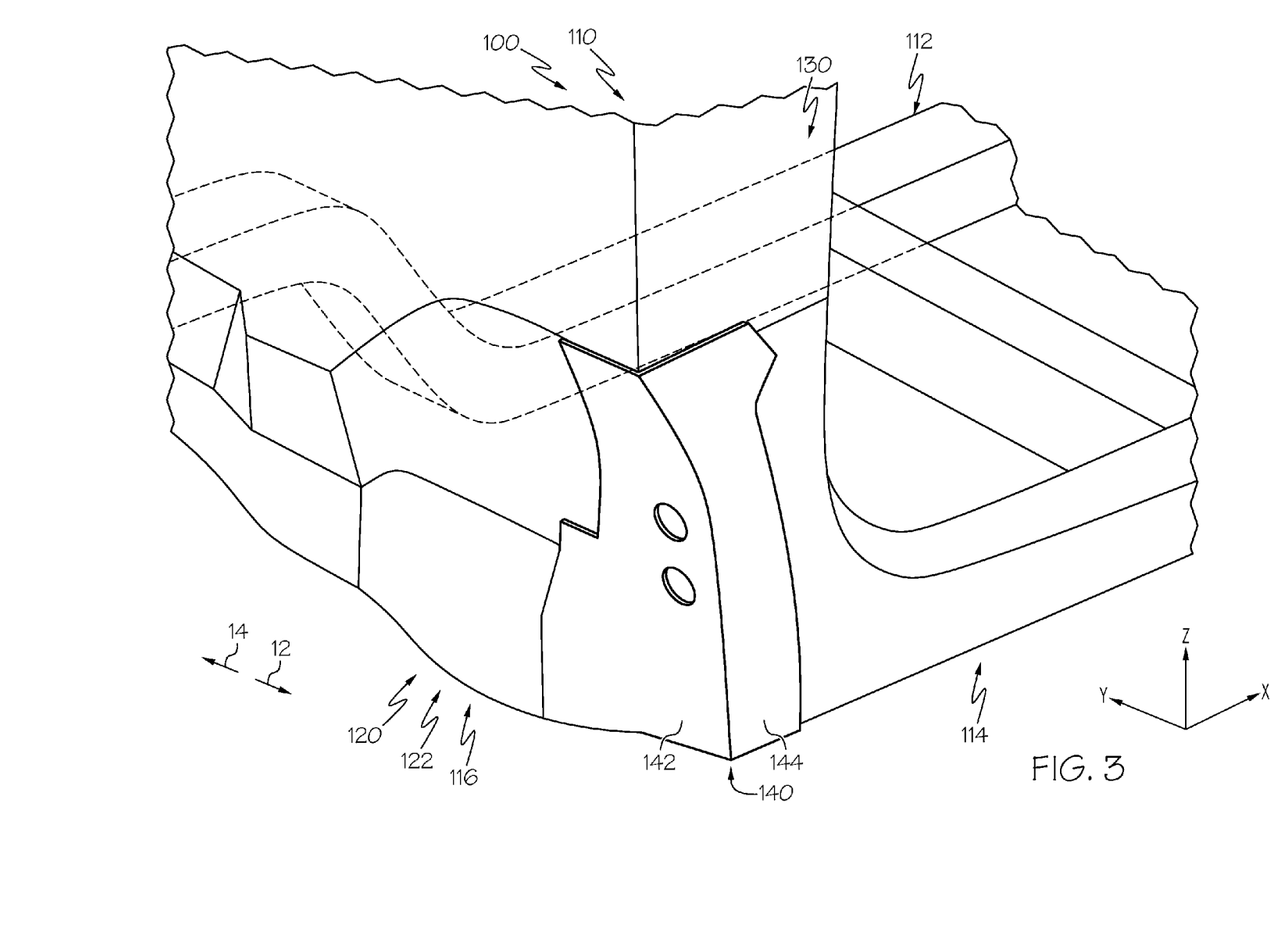
FIG. 3 schematically depicts an enlarged perspective view of the body of FIG. 2 including a reinforcement member according to one or more embodiments shown or described herein.

Referring to FIG. 3, the body 110 further includes a torque box 116 positioned between the side support 112 and the rocker 114 in the vehicle lateral direction. The torque box 116 spans between the side support 112 and the rocker 114 in the vehicle lateral direction and is coupled to both the side support 112 and the rocker 114. In some embodiments, the torque box 116 is integral with the side support 112 and/or the rocker 114. In other embodiments, the torque box 116 may be integral with one of the side support 112 and the rocker 114, and may be coupled to the other of the side support 112 and the rocker 114. The torque box 116 provides lateral structural rigidity to the body 110 to counteract stresses generated by torque from the drive source during operation of the vehicle. The side support 112, the rocker 114, and the torque box 116 may be positioned rearward from and/or may form a portion of the wheel well 120 and/or the dash panel 118 of the vehicle 100. In some embodiments, the side support 112, the rocker 114, and the torque box 116 may form a portion of the radially-inward facing side 122 of the wheel well 120.

The vehicle 100 includes a reinforcement member 140 that is coupled to the body 110 of the vehicle 100. The reinforcement member 140 is positioned such that at least a portion of the reinforcement member 140 is positioned within the wheel well 120 of the vehicle 100. The reinforcement member 140 may be formed from a variety of materials including, for example and without limitation, metals, composites, and the like, and may be formed by any suitable method or combination of methods such as stamping, forging, machining, and the like. The reinforcement member may be coupled to various components of the body 110 through a variety of joining techniques, including, but not limited to, a welded attachment, a brazed attachment, mechanical fasteners, and/or structural adhesives.

The reinforcement member 140 includes a forward face 142 that is oriented to face forward in the vehicle longitudinal direction. The forward face 142 may extend upward from the rocker 114 along the forward pillar 130. The forward face 142 of the reinforcement member 140 may extend inboard of the rocker 114, such that at least a portion of the forward face 142 extends across the torque box 116 in the vehicle lateral direction. The forward face 142 of the reinforcement member 140 may be coupled to the torque box 116 and/or the forward pillar 130.

The reinforcement member 140 may include an outboard face 144 that is oriented to face outboard in the vehicle lateral direction. The outboard face 144 may face in a direction that is substantially orthogonal to the forward face 142 of the reinforcement member 140. The outboard face 144 extends rearward from the forward face 142 of the reinforcement member 140. The outboard face 144 extends upward from the rocker 114 in the vehicle vertical direction along the forward pillar 130. The outboard face 144 may be coupled to the forward pillar 130 and/or the rocker 114.

Figure 4:
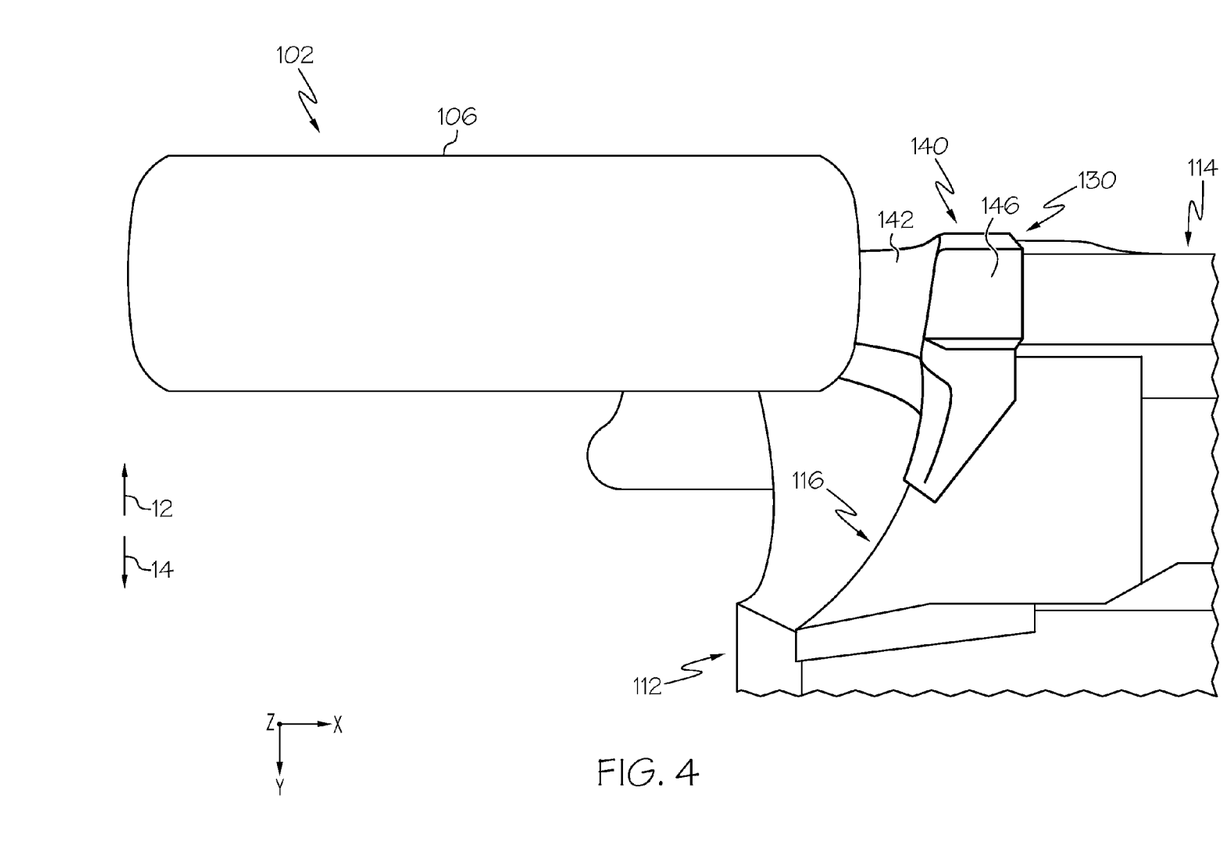
FIG. 4 schematically depicts a bottom view of the body and the reinforcement member of FIG. 3 according to one or more embodiments shown or described herein.

Referring to FIG. 4, a bottom view of the reinforcement member 140 and the front suspension unit 102 is shown. The reinforcement member 140 may include a downward face 146 that is oriented to face downward in the vehicle vertical direction. The downward face 146 may be oriented to face in a direction that is substantially orthogonal to the forward face 142 and the outboard face 144 of the reinforcement member 140. The downward face 146 extends inboard from outboard face 144 of the reinforcement member 140 across the torque box 116 in the vehicle lateral direction. The downward face 146 may be coupled to the forward pillar 130 and/or the torque box 116.

Accordingly, through the forward face 142, the outboard face 144, and the downward face 146, the reinforcement member 140 may be coupled to the forward pillar 130, the torque box 116, and/or the rocker 114. By coupling the reinforcement member 140 to the forward pillar 130, the torque box 116, and/or the rocker 114, during a small front bumper overlap impact, the reinforcement member 140 may distribute energy and/or forces associated with the impact among the forward pillar 130, the torque box 116, and/or the rocker 114. Further, as the reinforcement member 140 may be coupled to the forward pillar 130, the torque box 116, and/or the rocker 114, the reinforcement member 140 may provide structure in addition to the forward pillar 130, the torque box 116, and/or the rocker 114. By providing additional structure, the reinforcement member 140 may increase the strength and/or stiffness of the forward pillar 130, the torque box 116, and/or the rocker 114 at positions proximate to the reinforcement member 140 as compared to a body 110 that does not include a reinforcement member 140. By increasing the strength and/or stiffness at positions proximate to the reinforcement member 140, the reinforcement member 140 may absorb and direct energy and/or forces associated with a small front bumper overlap impact.

Figure 5:
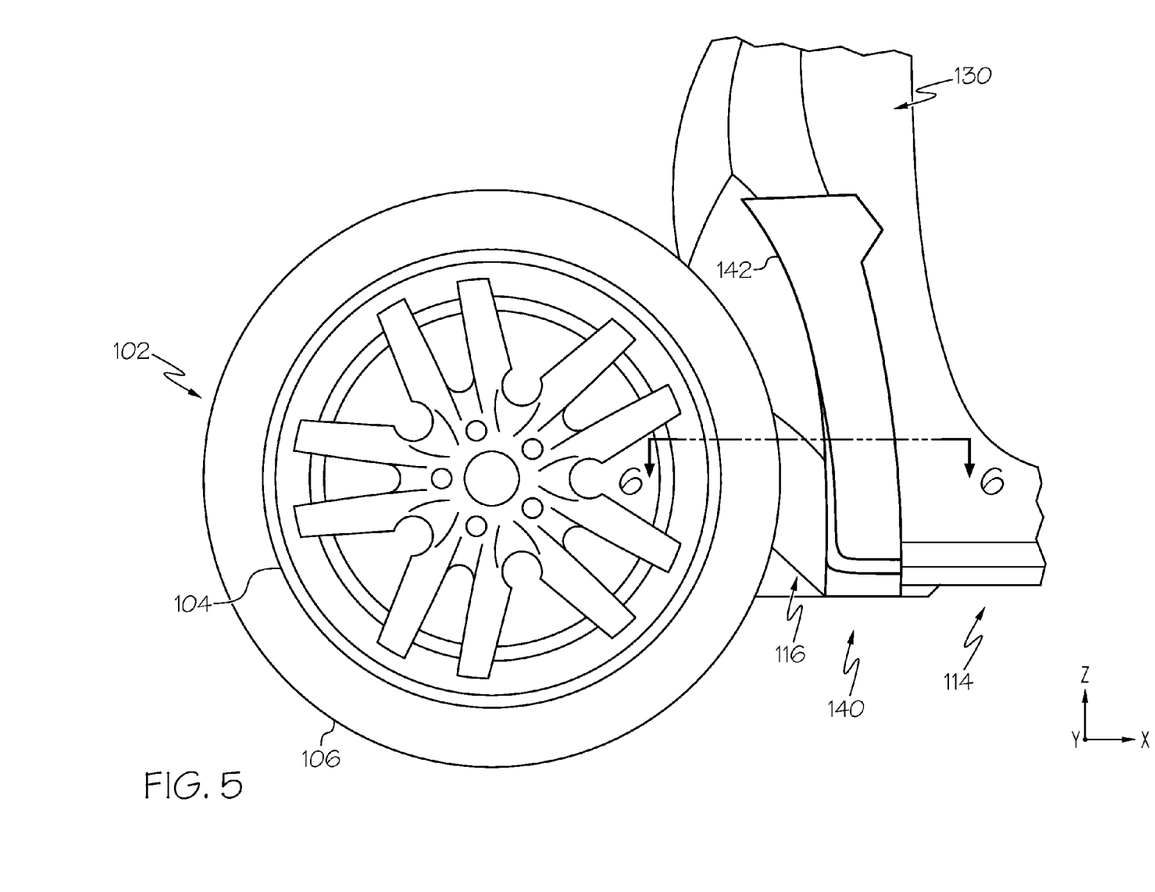
FIG. 5 schematically depicts a side view of the body and the reinforcement member of FIG. 4 according to one or more embodiments shown or described herein.

Referring collectively to FIGS. 4 and 5, the reinforcement member 140 is positioned rearward of the front suspension unit 102 in the vehicle longitudinal direction. In particular, as at least a portion of the reinforcement member 140 is positioned between the front suspension unit 102 and the forward pillar 130, the rocker 114, and the torque box 116 in the vehicle longitudinal direction. As the reinforcement member 140 is positioned rearward of the front suspension unit 102, the reinforcement member 140 may absorb and direct energy and/or forces associated with a small front bumper overlap impact resulting from rearward translation of the front suspension unit 102.

Figure 6:
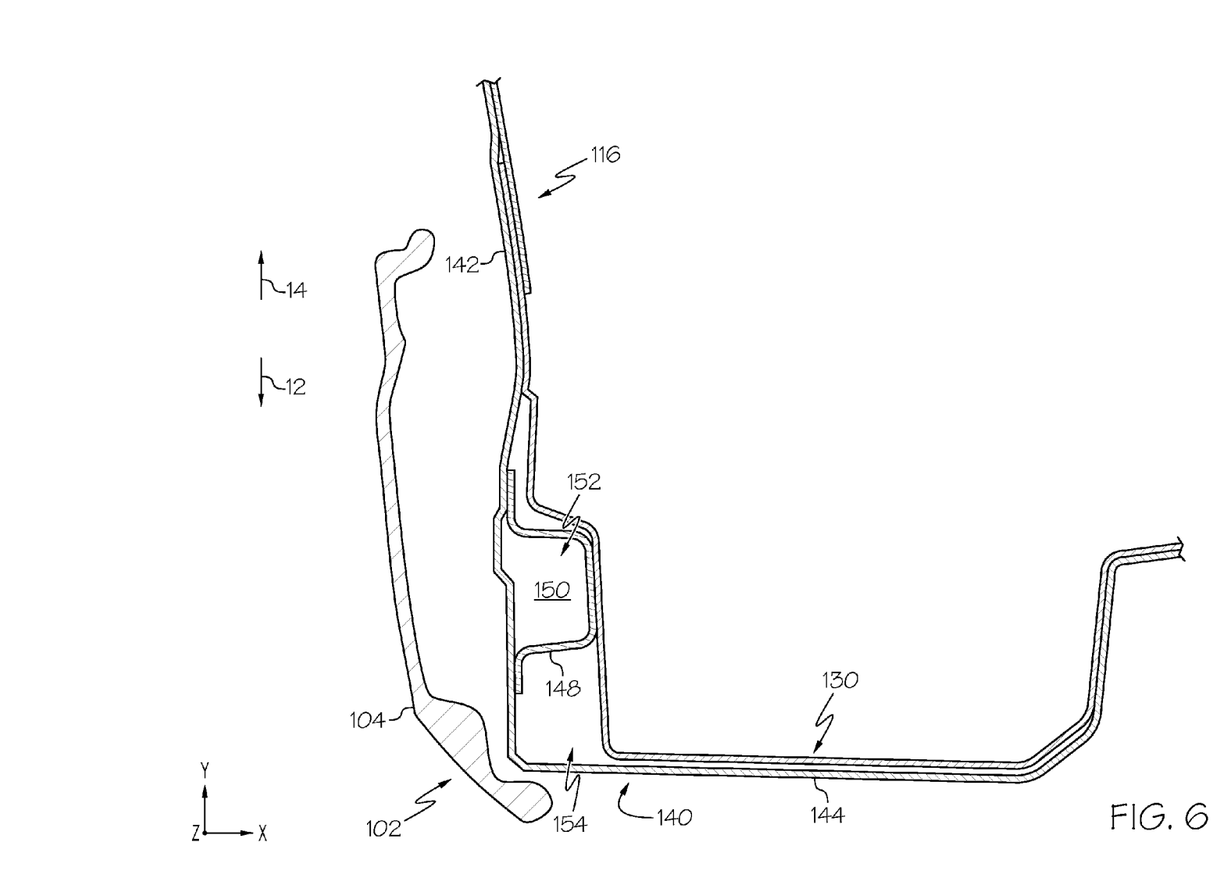
FIG. 6 schematically depicts a sectional view of the body and the reinforcement member of FIG. 5 along section 6-6 according to one or more embodiments shown or described herein.

Referring to FIG. 6, a section view of the reinforcement member 140, the forward pillar 130, and the front suspension unit 102 is depicted along section 6-6 of FIG. 5 prior to a small front bumper overlap impact. The front suspension unit 102 is depicted without the tire 106 (FIG. 5) for clarity. As described above, the reinforcement member 140 includes the forward face 142 and the outboard face 144. At least a portion of the forward face 142 and the outboard face 144 of the reinforcement member 140 are detached and spaced apart from the forward pillar 130 in the vehicle longitudinal direction and the vehicle lateral direction, respectively. In particular, at least a portion of the forward face 142 and the outboard face 144 are positioned forward and outboard of the forward pillar 130 such that a gap 150 is positioned between the forward pillar 130 and the reinforcement member 140. The forward face 142 and the outboard face 144 may at least partially enclose the gap 150 in the vehicle longitudinal and the vehicle lateral directions.

A septum member 148 may extend between the forward pillar 130 and the forward face 142 of the reinforcement member 140 in the vehicle longitudinal direction across the gap 150. Alternatively, the septum member 148 may extend between the forward pillar 130 and the outboard face 144 in the vehicle lateral direction across the gap 150. The septum member 148 may divide the gap 150 into a first lumen 152 and a second lumen 154. During a small front bumper overlap impact, the wheel 104 of the front suspension unit 102 may contact the reinforcement member 140, causing the reinforcement member 140 to selectively deform and translate rearward in the vehicle longitudinal direction. As the reinforcement member deforms and translates rearward, the gap 150 and/or the first lumen 152 and the second lumen 154 may collapse in the vehicle longitudinal direction, which may absorb energy associated with the impact.

When a vehicle impacts a barrier, vehicle structures may elastically and plastically deform to absorb energy while slowing the vehicle from its previous operating speed. The vehicle structures divert and absorb the energy associated with the moving vehicle into energy that deforms the vehicle structures. The vehicle structures may be designed to accommodate the introduction of the energy of the impact, such that the energy associated with the impact may be controllably dissipated and directed through selective and preferential deformation of the vehicle structures.

The front corner of the vehicle may impact an object in what is referred to herein as a small front bumper overlap or a small overlap impact. In a small front bumper overlap impact, the impact occurs at an outboard portion of the vehicle (evaluated in a vehicle lateral direction), and only a portion of the front bumper strikes the object. In some small front bumper overlap impacts, no more than about 25% of the front bumper strikes the object. In such impacts, some of the energy dissipation elements of the vehicle may not be initiated or may be only partially initiated. In such impacts, the energy that is introduced to the vehicle structures may be non-symmetrical when evaluated in the vehicle lateral direction. Accordingly, the reaction of the vehicle structures to the energy introduced by the small overlap impacts may introduce a non-symmetrical response to the vehicle structures. Referring to embodiments disclosed herein, the structural members of the body 110 for example, may be non-symmetrically loaded when the vehicle is involved in a small overlap impact.

Because only a portion of the front bumper strikes an object during a small front bumper overlap impact, all of the energy absorbing structures associated with the front bumper may have a reduced effect on the dissipation of energy of the impact. In particular, some of the energy absorbing structures associated with the bumper assembly of the vehicle 100 may not be activated or may be only partially activated, such that a portion of the energy absorbing structure of the vehicle may not dissipate energy associated with the small front bumper overlap impact. Instead, the energy and/or forces associated with the impact may be directed into the front suspension unit 102 of the vehicle 100 proximate to the barrier that the vehicle impacts. As energy from the impact may be directed into the front suspension unit 102 of the vehicle 100, the front suspension unit 102 may translate rearward in the vehicle longitudinal direction and may contact the cabin 108 of the vehicle, transmitting energy and/or forces associated with the impact into the cabin 108 of the vehicle 100.

Figure 7:
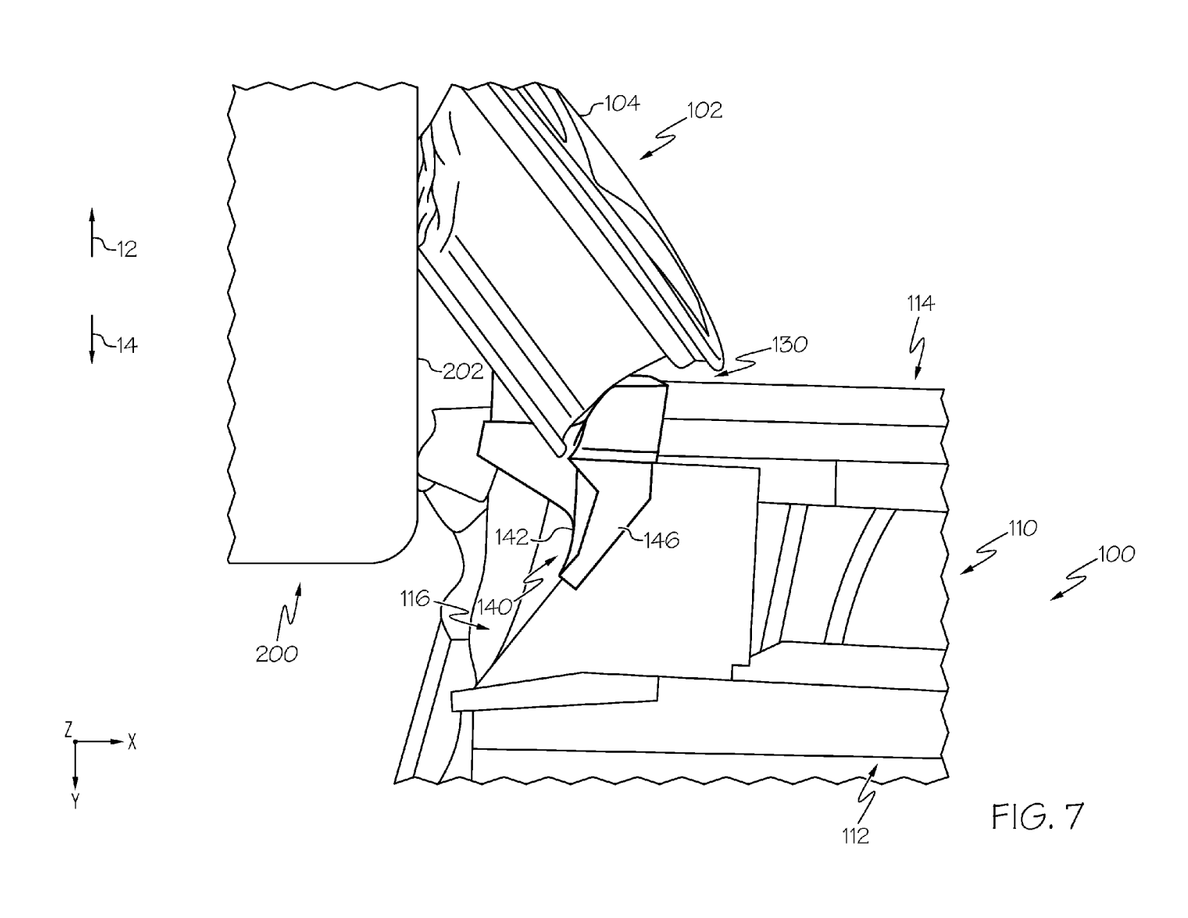
FIG. 7 schematically depicts a bottom view of the body and the reinforcement member of FIG. 4 during a small front bumper overlap impact according to one or more embodiments shown or described herein.

Referring to FIG. 7, a bottom view of the body 110 of the vehicle 100 is depicted during a small front bumper overlap impact. A barrier 200 including a vehicle-facing surface 202 may impact the body 110 of the vehicle 100 in a small front bumper overlap impact. As the barrier 200 impacts the body 110 of the vehicle 100, energy associated with the impact may cause the front suspension unit 102 including the wheel 104 to deform and translate rearward in the vehicle longitudinal direction. As the wheel 104 of the front suspension unit 102 deforms and translates rearward in the vehicle longitudinal direction, the wheel 104 may contact the reinforcement member 140.

As described hereinabove, the reinforcement member 140 may be coupled to and may increase a strength and/or stiffness of the forward pillar 130, the rocker 114, and/or the torque box 116 at positions proximate to the reinforcement member 140. By increasing the strength and/or stiffness of the forward pillar 130, the rocker 114, and/or the torque box 116, the reinforcement member 140 may direct forces and/or energy associated with the impact. In particular, the reinforcement member 140 may resist forces and/or energy associated with the impact that are directed rearward in the vehicle longitudinal direction as a result of contact between the wheel 104 and the reinforcement member 140. As the reinforcement member 140 may resist forces and/or energy associated with the impact that are directed rearward in the vehicle longitudinal direction, the reinforcement member 140 may encourage the wheel 104 and the front suspension unit 102 to deflect outboard and away from the body 110 of the vehicle 100 during the impact. By deflecting outboard and away from the body 110 of the vehicle, the wheel 104 and the front suspension unit 102 may impart less force and/or energy associated with the impact to the body 110 as compared to impact configurations in which the wheel 104 and the front suspension unit 102 deform and translate in a generally rearward direction, which may thereby reduce intrusion of the front suspension unit 102 into the cabin 108 of the vehicle.

It should now be understood that vehicles according to the present disclosure include a reinforcement member that includes a forward face, and at least one of a downward face and an outboard face. The forward face, the downward face, and the outboard face may be coupled to a rocker, a forward pillar, and/or a torque box of the vehicle, and may increase the strength and/or stiffness of the rocker, the forward pillar, and/or the torque box proximate to the reinforcement member. By increasing the strength and/or stiffness of the rocker, the forward pillar, and/or the torque box, the reinforcement member may absorb and direct energy and/or forces associated with a small front bumper overlap impact. In some embodiments, the forward face and the outboard face of the reinforcement member may be spaced apart from the forward pillar, and a gap may be positioned between the forward pillar and the forward face and the outboard face of the reinforcement member. When a front suspension unit contacts the reinforcement member, such as during a small front bumper overlap impact, the reinforcement member may selectively deform and collapse the gap, thereby absorbing energy associated with the impact.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
  a wheel well comprising a radially inward facing side;
  a suspension unit comprising a wheel that is positioned at least partially within the wheel well;
  a rocker coupled to the wheel well, wherein the rocker extends rearward from the wheel well in a vehicle longitudinal direction;
  a torque box extending inboard from the rocker in a vehicle lateral direction that is transverse to the vehicle longitudinal direction, wherein the torque box is positioned rearward from the wheel well in the vehicle longitudinal direction; and
  a reinforcement member positioned at least partially within the wheel well, the reinforcement member comprising:
    a forward face that is coupled to the radially inward facing side of the wheel well;
    a downward face that is coupled to and extends below a bottom surface of the torque box in the vehicle lateral direction and that is oriented to face downward in a vehicle vertical direction; and
    an outboard face that is coupled to and extends along the rocker and that is oriented to face outboard in the vehicle lateral direction.

2. The vehicle of claim 1, further comprising a forward pillar coupled to the rocker, wherein the forward pillar extends upward from the rocker in the vehicle vertical direction.

3. The vehicle of claim 2, wherein the outboard face extends upward from the rocker along the forward pillar.

4. The vehicle of claim 2, wherein the outboard face is coupled to the forward pillar.

5. The vehicle of claim 2, wherein at least a portion of the forward pillar is positioned rearward of and spaced apart from the forward face of the reinforcement member in the vehicle longitudinal direction such that a gap is positioned between the forward face and the forward pillar.

6. A vehicle comprising:
- a rocker that extends in a vehicle longitudinal direction;
- a forward pillar coupled to the rocker, wherein the forward pillar extends upward from the rocker in a vehicle vertical direction;
- a torque box extending inboard from the rocker in a vehicle lateral direction that is transverse to the vehicle longitudinal direction; and
- a reinforcement member comprising:
  - a forward face that extends along the forward pillar and that is oriented to face forward in the vehicle longitudinal direction; and
  - a downward face that is coupled to and extends below a bottom surface of the torque box in the vehicle lateral direction and that is oriented to face downward in a vehicle vertical direction; and
  - an outboard face that is coupled to and extends along the rocker and that is oriented to face outboard in the vehicle lateral direction.

7. The vehicle of claim 6, wherein the forward face, the downward face, and the outboard face are oriented to face in substantially orthogonal directions with respect to each other.

8. The vehicle of claim 6, wherein the forward face of the reinforcement member is coupled to the torque box and the forward pillar.

9. The vehicle of claim 6 wherein the forward pillar is positioned rearward of and spaced apart from the forward face of the reinforcement member in the vehicle longitudinal direction such that a gap is positioned between the forward face and the forward pillar.

10. A vehicle comprising:
- a rocker that extends in a vehicle longitudinal direction;
- a forward pillar coupled to the rocker, wherein the forward pillar extends upward from the rocker in a vehicle vertical direction;
- a torque box that extends inboard from the rocker; and
- a reinforcement member comprising:
  - a forward face that is positioned forward of and spaced apart from the forward pillar such that a gap is positioned between the forward face and the forward pillar;
  - a downward face that is coupled to and extends below a bottom surface of the torque box in the vehicle lateral direction and is oriented to face downward in the vehicle vertical direction; and
  - an outboard face that is coupled to the forward pillar and the rocker such that the gap is at least partially enclosed between the reinforcement member and the forward pillar.

11. The vehicle of claim 10, wherein the forward face, the downward face, and the outboard face are oriented to face in substantially orthogonal directions with respect to each other.

12. The vehicle of claim 10, further comprising a suspension unit positioned forward of the forward pillar and the rocker in the vehicle longitudinal direction.

13. The vehicle of claim 12, wherein when a barrier impacts the vehicle, the suspension unit translates rearward in the vehicle longitudinal direction and impacts the reinforcement member, causing the gap to collapse in the vehicle longitudinal direction.

\* \* \* \* \*